Figure 1:
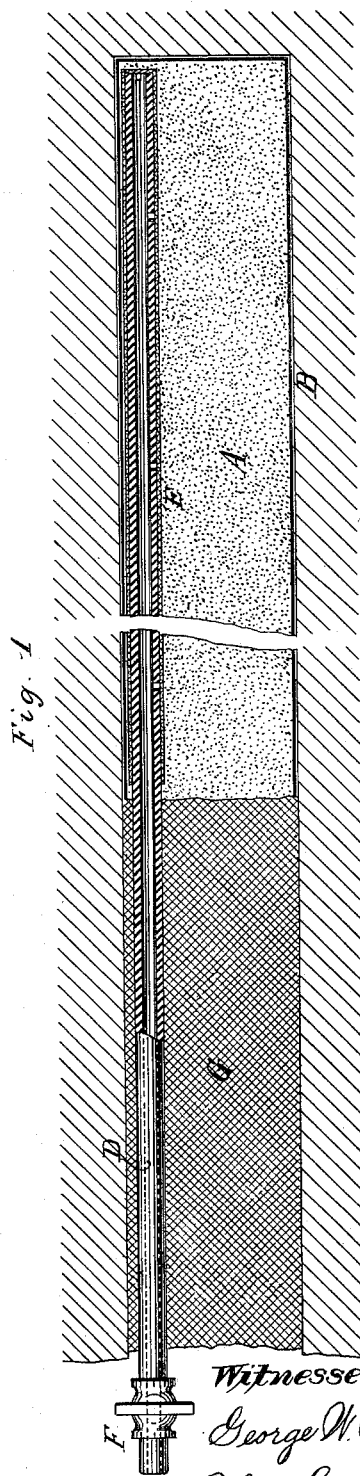

(No Model.)

C. S. SMITH & T. MOORE.
METHOD OF AND APPARATUS FOR BREAKING DOWN OR GETTING COAL, &c.

No. 255,042. Patented Mar. 14, 1882.

Witnesses.
George W. Rea.
Robert Everett.

Inventors.
Charles S. Smith,
Thomas Moore.
By James L. Norris.
Atty.

UNITED STATES PATENT OFFICE.

CHARLES SEBASTIAN SMITH, OF LEICESTER, COUNTY OF LEICESTER, AND THOMAS MOORE, OF SHIPLEY, COUNTY OF DERBY, ENGLAND.

METHOD OF AND APPARATUS FOR BREAKING DOWN OR GETTING COAL, &c.

SPECIFICATION forming part of Letters Patent No. 255,042, dated March 14, 1882.

Application filed February 21, 1882. (No model.) Patented in England May 4, 1881.

*To all whom it may concern:*

Be it known that we, CHARLES SEBASTIAN SMITH and THOMAS MOORE, citizens of England, residing respectively at Leicester, in the county of Leicester, England, and at Shipley, in the county of Derby, England, have invented an Improved Method of and Apparatus for Breaking Down, or Getting Coal and other Minerals in Mining, Quarrying, or Tunneling Operations, (for which we have obtained a patent in Great Britain, No. 1,939, bearing date May 4, 1881,) of which the following is a specification.

According to our present invention we effect the breaking down or "getting" of coal and other minerals in mines, quarries, or tunnels by means of caustic lime introduced into boreholes in the said minerals, and then brought into contact in a confined condition with water, so that by the expansion of the lime in becoming slaked and by the pressure of steam generated considerable force is produced sufficient to effect the breaking down of the mineral. By this means in the case of coal-mines the double advantage is gained of effecting the breaking down of the coal without danger of explosion of fire-damp and with the production of a greatly reduced proportion of small coal as compared with the ordinary blasting operation.

Our invention may be carried into practice in a variety of ways; but according to the arrangement and mode of operating by preference employed by us the caustic lime is ground fine and then consolidated by pressure into cartridge form, each cartridge having a groove on the side, which cartridges are inclosed in waterproof casings or packed into air-tight boxes, or both, to protect them from damp. An iron tube provided with perforations and having a covering of cotton or other fibrous fabric or material to prevent the lime from entering the perforations, and also fitted with a tap or automatic check-valve or other means of closing it, is first inserted along the whole length of the bore-hole. The cartridges are then introduced, the surface of the groove being next to the tube, and they are rammed so as to insure their filling the bore-hole. After the cartridge or cartridges have been inclosed, either by tamping with clay or other suitable material, or by a bung, or otherwise, a force-pump is connected with the said tube, and the water is so conveyed to the lime. When the water has been forced in the pipe connecting the pump or other power with the said tube is detached, and the tube is closed, so as to prevent the escape of the steam generated by the action of the water on the lime.

In cases where the material operated upon is so dense as not to allow the escape through it of the air when the water is being forced in, we form on the before-described tube a very small external channel, sufficient to allow the air to escape gradually as the water is forced in, but too small to allow any appreciable quantity of steam to escape afterward.

In order to cause the whole mass of the cartridge or cartridges to be subjected more or less simultaneously to the action of the water, so as to bring about a rapid and energetic action, the cartridge may either have a groove, as before mentioned, formed along its side, or it may be formed with a hole through its center, along which groove or hole the said tube for conveying the water is placed; or the tube may merely enter the front end thereof, so that the water is forced in along the whole length of the cartridge or cartridges; or a solid rod or needle may first be inserted into the borehole, and after the cartridges have been inserted and inclosed by tamping or by a bung, or otherwise the needle may be withdrawn and a tube inserted in its place, which tube is fitted with a tap or other means of closing it, and through this tube the water may be conveyed to the lime.

The lime we prefer to use is made from mountain limestone.

Although we prefer to employ the caustic lime in the form of consolidated cartridges, as described, yet it may also be rammed into the bore-holes in an unprepared condition, the tube for conveying the water being first introduced into the bore-hole at the side or center thereof; or a solid rod or "needle" may be introduced in the first instance, as aforesaid, and after withdrawing the same the tube for the water-supply may be inserted in its place.

If desired, other fluids—such as diluted sulphuric acid—may be employed, or the water may be used hot to accelerate the expansive action of the lime, and other substances may be mixed with the lime for the same purpose.

Figure 2:
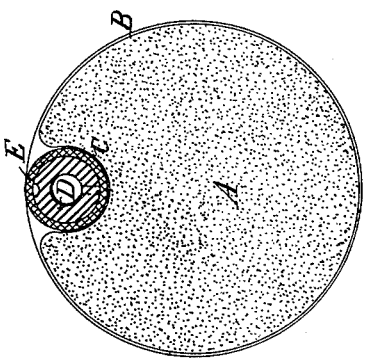

Figure 1 shows a longitudinal section of one arrangement of our before-described lime-cartridge, and Fig. 2 shows an enlarged cross-section of the same.

A is the compressed caustic lime, inclosed in a water-proof-paper casing, B, and having at C a groove, into which is inserted the perforated metal tube D, covered with a cotton or other suitable porous covering, E, and having at its outer end a tap, F, which is closed after the requisite water-supply has been forced in.

G is the tamping for inclosing the cartridge in the bore-hole.

Having thus described the nature of our invention and in what manner the same is to be performed, we wish it to be understood that we do not claim broadly the use of caustic lime for breaking down coal, as we are aware that unsuccessful attempts have before been made to use lime for that purpose; but

We claim—

1. The method of breaking down or getting coal and other minerals by the introduction into bore-holes of caustic lime, which, after compression and confining by tamping or otherwise, is brought into contact with water or other suitable liquid along the entire or greater part of the length of the charge, so as by the expansion of the lime and pressure of the steam generated to produce sufficient force for breaking down the mineral, substantially as herein described.

2. For breaking down or getting coal and other minerals, a cartridge formed of compressed caustic lime, having one or more longitudinal grooves or passages to serve as channels for the introduction of water.

3. In combination with cartridges or charges of caustic-lime, a perforated or slotted or permeable tube placed along the side or through the body thereof, and serving to bring water into intimate contact therewith, substantially as herein described.

4. In combination with the perforated or slotted tube for lime-cartridges, a covering of woven fabric for preventing the lime from entering the holes of the tube, substantially as described.

In testimony whereof we have signed our names to this specification, in the presence of two subscribing witnesses, this 18th day of November, A. D. 1881.

CHARLES SEBASTIAN SMITH.
THOMAS MOORE.

Witnesses:
GEORGE WILLIAM REYNOLDS,
 30 *Kedleston Road, Derby,*
WILLIAM WOOLLEY,
 13 *London Street, Derby,*
Clerks with John Moody, Solicitor and Notary Public, Derby, England.